United States Patent [19]

Edwards et al.

[11] 4,325,726
[45] Apr. 20, 1982

[54] DOUBLE JAWED SHAPING TOOL FOR GLASS VIALS

[75] Inventors: Ralston G. Edwards, Newfield; Albert S. Goffredi, Vineland; John Lisi, Newfield; Gregory Murphy, Erial, all of N.J.

[73] Assignee: Owens-Illinois, Inc., Toledo, Ohio

[21] Appl. No.: 186,056

[22] Filed: Sep. 11, 1980

[51] Int. Cl.³ .............................................. C03B 23/09
[52] U.S. Cl. ........................................ 65/298; 65/276; 65/296
[58] Field of Search ................. 65/276, 277, 295, 296, 65/298, 299

[56] References Cited

U.S. PATENT DOCUMENTS 2,952,943  9/1960  Zauner ................................... 65/296
3,343,937  9/1967  Lewis ................................. 65/277 X

FOREIGN PATENT DOCUMENTS 22250 of 1907 Sweden ................................. 65/296

*Primary Examiner*—Arthur D. Kellogg

*Attorney, Agent, or Firm*—Richard D. Heberling; Myron E. Click; David H. Wilson

[57] ABSTRACT

The invention provides a precision tooling machine for final finishing of a preliminary formed shoulder on the open end of a heated glass vial blank. The shoulder of the vial is heated and the vial is rotated and horizontally advanced between a pair of co-operating tooling jaws which are respectively mounted on support arms which are in turn rigidly secured to a vertically slidably support plate. The entire weight of the tooling jaws, the support arms and the support plate is effectively counter-balanced so that tooling jaw units may move without restraint to accommodate themselves to the vertical position of the particular vial passing between the tooling jaws. At the same time, one of the jaw units is freely laterally shiftable a slight amount relative to the other jaw unit so as to prevent the possibility of differential heating of the tooling jaws or their respective support arms causing a misalignment of one tooling jaw relative to the other tooling jaw. The disclosed apparatus is conveniently adjustable to handle a wide range of vial sizes and shaping tools.

8 Claims, 9 Drawing Figures

DOUBLE JAWED SHAPING TOOL FOR GLASS VIALS

BACKGROUND OF THE INVENTION

The formation of vials from short lengths of glass tubing is a well known manufacturing practice. Obviously, to convert a length of glass tubing into a vial, the one end of the tubing must be closed, generally in a semi-spherical shape and the other open end must be shaped so as to provide sealing surfaces for a closure or stopper. The most common form of closure for a vial is now fabricated by injection molding of a thermoformed plastic. Such closures are formed to relatively precise dimensions and it necessarily follows that for the closure to properly function, the open or finish end of the vial must be similarly formed to accurate dimensions. Thus, the bore of the vial neck should define a true cylindrical surface of accurate diameter. Moreover, the flanges provided on the external surfaces of the vial neck for retaining a closure thereon must be similarly accurately formed.

The tools heretofore employed for finishing the interior and exterior surfaces of the neck flanges of the vial have not been found capable of maintaining a high degree of forming accuracy as the speed of forming the vials and the length of production runs have been gradually increased over the years. One such existing system for forming the open end of a glass vial is that disclosed in U.S. Pat. No. 2,952,943 to Zauner. The mechanism employed in the Zauner patent effects reasonably reliable tooling of the internal diameter of the vial neck opening, as was required when vials were primarily closed by insertion of stoppers. The accurate formation, however, of an external shoulder on the periphery of the vial by the mechanism disclosed in the Zauner patent was not possible because such mechanism merely constituted a stationary anvil over which the neck portions of the vial were rolled during the forming operation on the interior surfaces. Such an arrangement obviously was not capable of producing an accurately dimensioned external shoulder on the vial finish.

A later form of commercially operated machine is disclosed in Lewis U.S. Pat. No. 3,343,937. In this patent, a mandrel is inserted in the heated mouth portion of the vial and the external surfaces of the vial are formed by two cooperating, rotating rollers which are brought into engagement with the top and bottom sides of the heated vial end and rotated to form threads or shoulders on the external periphery of the vial neck. The cooperating rollers are mounted on a pair of medially pivoted arms and the other ends of the arms are biased toward the desired final tooling position by a common spring mounted on a shaft carrying a pair of stop members which define the limiting inward movement of the tooling rollers. This mechanism works satisfactorily if the axis of the vial being operated on is precisely aligned with the center line between the two tooling rollers, but if the vial is misaligned slightly, the mechanism is incapable of adjusting the position of the tooling rollers to accommodate such misalignment, without imposing a greater force on one of the rollers, hence inaccuracy in the forming of the threads or projections on the vial end necessarily resulted. Differential heat expansion of the roller supports will also produce lateral misalignments of the forming tools.

SUMMARY OF THE INVENTION

The present invention relates to an apparatus for final shaping of the external neck surfaces of glass vials, and more particularly, the invention pertains to a double jawed tool capable of accurately forming an external shoulder on the finish portion of a vial neck. As the heated vial blank is moved along a conveyor, with the finish portion of the vial at a sufficiently elevated temperature as to permit shaping of such finish portion, a mandrel is inserted in the bore of the vial and the desired external shoulder on the vial is preliminarily formed in prior operations. To accurately re-form such external shoulder to the desired final dimensions, the heated rotating vial end, mounted on a mandrel, is passed between a pair of forming jaws which are respectively adjustably mounted in cantilevered relationship on a counter-weighted, vertically floating support structure, which insures that the minimum vertical spacing between the forming jaws is always maintained at a selected value, thus insuring the accuracy of the diameter of the resulting shoulder formed on the vial end. Vertical misalignment of the vial axis relative to the forming jaws is readily accomodated by the vertically floating jaws. Additionally, one of the forming jaws supports is readily shiftable a limited amount in a plane transverse to the direction of movement of the vials in order to permit it to accommodate any misalignment with the other formng jaw produced by differential thermal expansion.

The relative spacing of the two forming jaws is conveniently adjusted by a mechanism provided in accordance with this invention and the relative transverse movement of the jaws is accomplished with a minimum of frictional restraint so as to avoid any distortion of the vial shoulder.

Further objects and advantages of the invention will become apparent to those skilled in the art from the following detailed description, taken in conjunction with the annexed sheets of drawings, on which is shown a preferred embodiment of the invention.

DESCRIPTION OF PREFERRED EMBODIMENT

Figure 5:
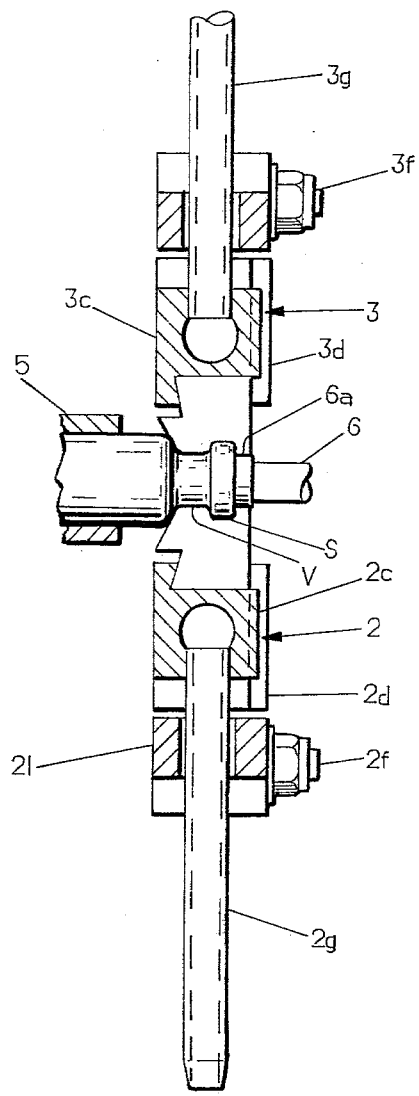
FIG. 5 is a vertical sectional view taken on the plane 5—5 of FIG. 3.

Referring to the drawings, numeral 1 represents generally a vial shoulder reforming station embodying this invention, which is incorporated in a complete line for the manufacture of vials having external shoulder portions formed on their open ends to precise dimensions. The equipment operating on the vials prior to their arrival at the forming station 1 forms no part of this invention. It may, for example, comprise the conveyor, vial heating arrangements and mandrel insertion mechanism disclosed in the aforementioned U.S. Pat. No. 3,343,973 to Lewis. In any event, the vial V arrives at the reforming station on a conveyor 5 (FIG. 5) with its open end portion preliminarily formed and in a sufficiently heated condition to permit reforming of the previously formed external shoulder portions on the vial to precise dimensions by passage through the reforming machine 1 embodying this invention.

Figure 1:
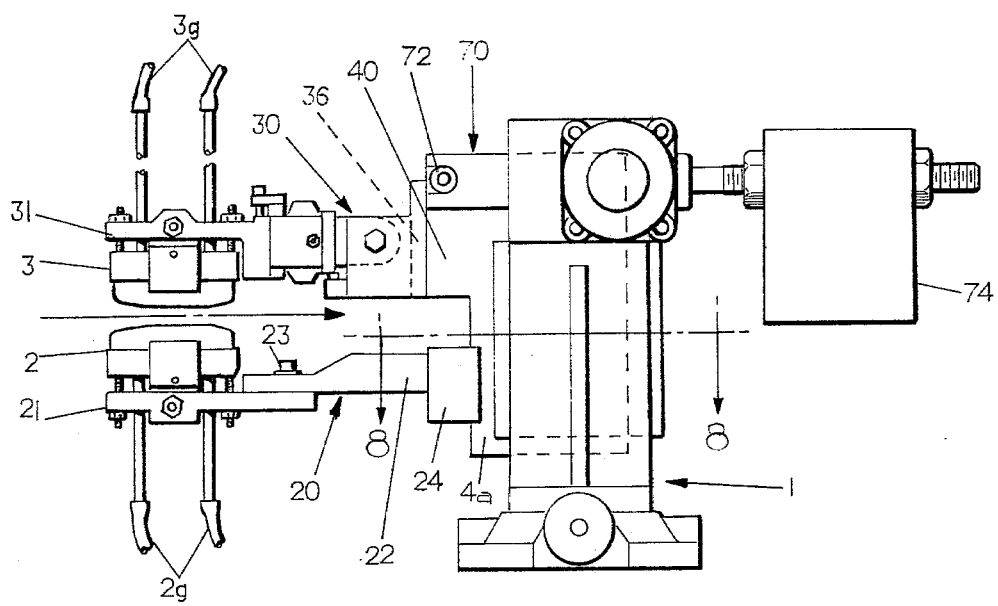
FIG. 1 is a side elevational view of a vial tooling machine incorporating this invention.
Figure 2:
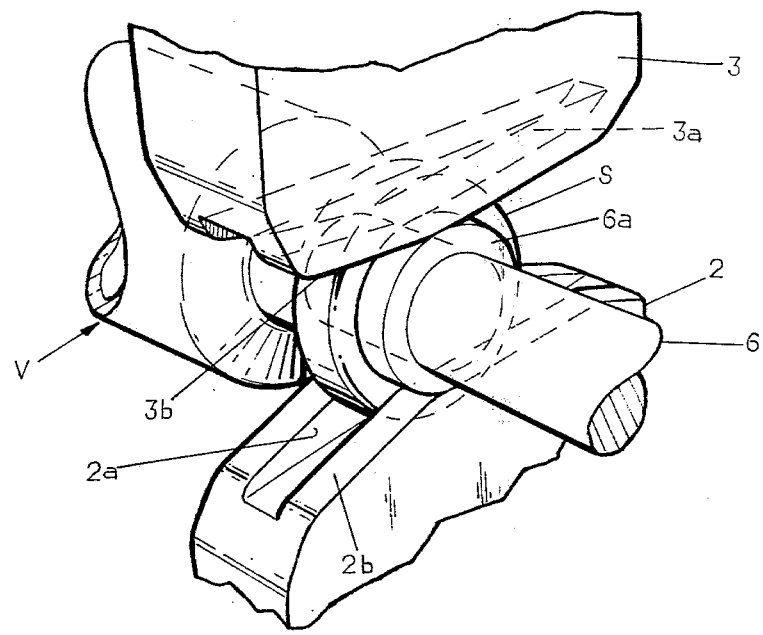
FIG. 2 is an enlarged scale, partial perspective view illustrating the engagement of the double formng jaws of the machine of FIG. 1 with a heated external flange provided on a vial to re-form such to a precise dimension.

Thus, referring specifically to FIGS. 1 and 2, the vial V arrives at the reforming machine 1 by being carried thereto by a conventional conveyor 5 and rotated thereby as it passes through the reforming station 1. A mandrel 6 is inserted in the open end of the vial V and insures that the internal diameter of the vial opening is maintained at the desired dimension. Mandrel shoulder 6a abuts the open end of vial V. Prior to its arrival at the reforming machine 1, the vial V has an enlarged shoulder S preliminarily formed on its open end and such shoulder has been heated to a suitable temperature to permit reforming of the shoulder S to a precise dimension by passage through a pair of vertically spaced forming jaw units 2 and 3 respectively mounted on the machine 1 and concurrently engaging the top and bottom portions of the shoulder S on the rotating vial V. For simplicity of illustration, it is assumed that it is desired to reform the shoulder S into a generally rectangular cylindrical section having precise axial and radial dimensions.

Each of the forming jaw units 2 and 3 is respectively provided with rectangular cross section forming slots 2a and 3a, which, when the jaw units 2 and 3 are positioned at a pre-determined vertical spacing, defines a passage corresponding precisely to the dimensions desired for the finished shoulder S on the vial V. The side walls of slots 2a and 3a are tapered at both their entering and leaving edges as indicated respectively at 2b and 3b so that the end of vial V and the preliminary formed shoulder S may readily enter the space defined between the slots 2a and 3a even though the vertical axis of the vial V, as determined by its position on the conveyor 5, may depart slightly from the center line of the spacing between the forming jaw units 2 and 3.

Figure 3:
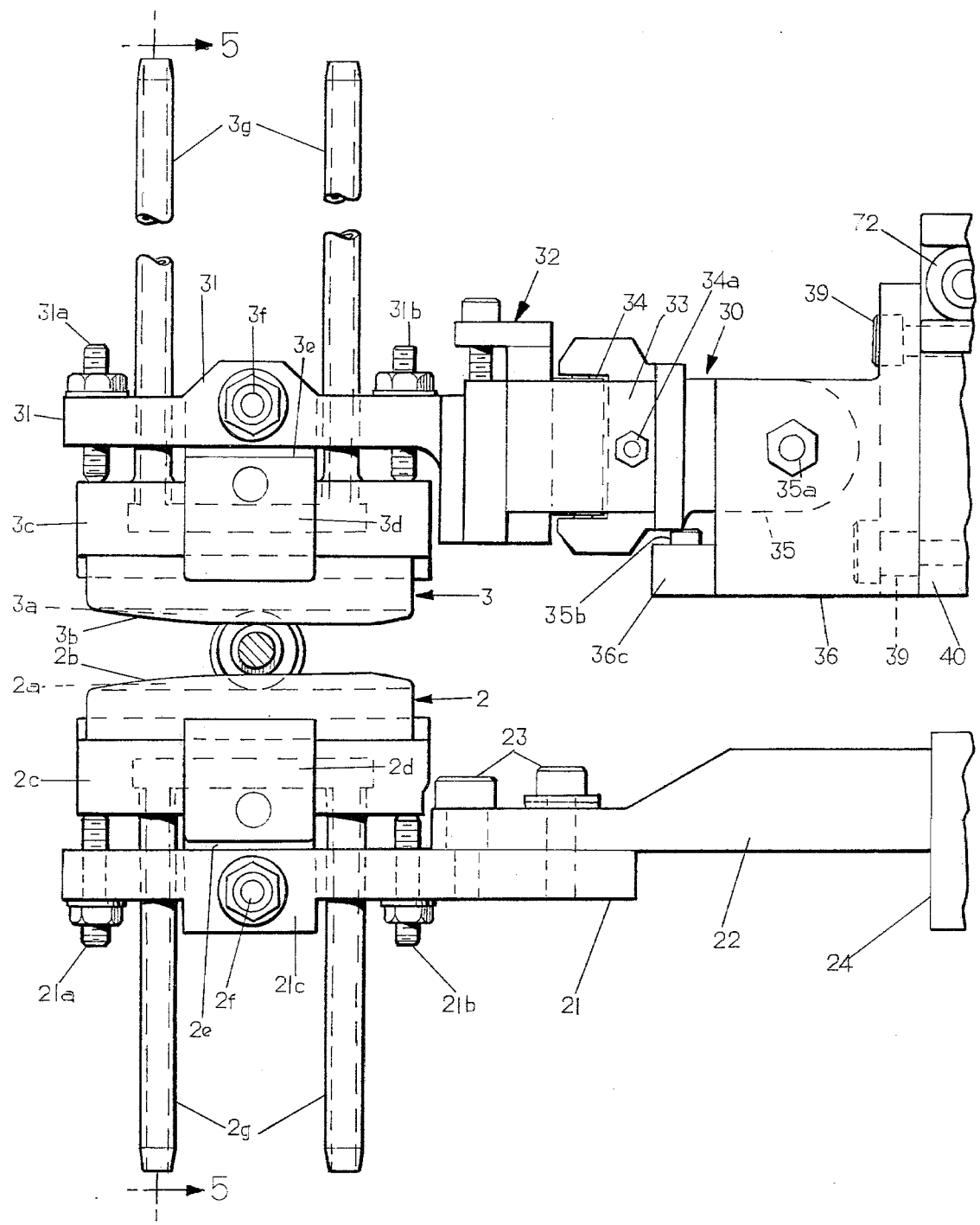
FIG. 3 is an enlarged scale side elevational view of the forming jaws and respective mounting mechanisms employed in the machine of FIG. 1.

In accordance with this invention, the jaw units 2 and 3 are respectively supported by mutually interconnected support arms 20 and 30 which are disposed in a generally parallel, vertically rigid relationship and are mounted in a manner hereinafter described, so as to vertically float between a narrow range of vertical positions. Thus, the forming jaw units 2 and 3 can readily accommodate variations in vertical position of the vial V to be reformed, due to the fact that no significant force is required to cause the jaws 2 and 3 to concurrently move vertically to conform to the particular vial passing between the jaws. Each forming jaw unit 2 and 3 respectively includes a hollow support 2c and 3c (FIG. 3), and cooling fluid is circulated therethrough by pipes 2g and 3g.

Each support block 2c and 3c is respectively secured to the outer end of an arm assembly 20 and 30 by yoke shaped support brackets 2d and 3d. The stem portions 2e and 3e of yokes 2d and 3d are respectively pivotally secured by bolts 2f and 3f between brackets 21c and 31c respectively provided on mounting plates 21 and 31.

Figure 8:
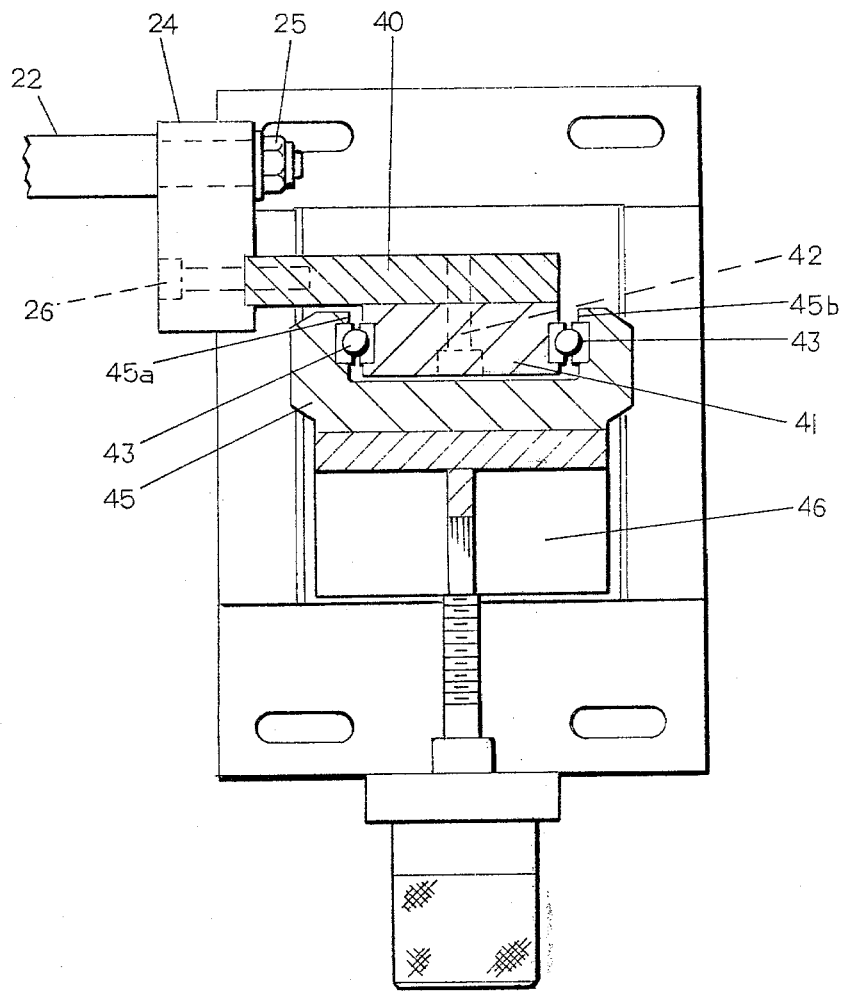
FIG. 8 is an enlarged scale, partial sectional view taken on the plane 8—8 of FIG. 1.

The lower jaw support arm assembly 20 includes a jaw mounting plate 21 secured to the end of an extension arm 22 by a plurality of bolts 23. Extension arm 22 is in turn secured by bolt 25 to a mounting block 24 which is secured by suitable bolts 26 (FIG. 8) to a vertically disposed slide plate 40. Plate 40 has a slide block 41 (FIG. 8) secured to one side thereof by suitable bolts 42 and the side walls of slide block 41 respectively provide a mounting for a pair of linear anti-friction bearings 43 which co-operate with the inner surfaces of opposed walls 45a and 45b of a generally U shaped upstanding vertical slide guide 45.

The upper jaw supporting arm assembly 30 is likewise secured to the slide plate 40 through a mechanism which permits vertical adjustment of upper jaw 3, limited lateral shifting movement of the free end of jaw arm 30 assembly relative to the portion secured to the slide plate 40, and also permits a spring opposed pivotal movement of the entire outer end of the arm assembly 30 to a generally vertical position so that the position of the forming jaw unit 3 carried at the free end of the support arm 30 may be conveniently adjusted.

Figure 6:
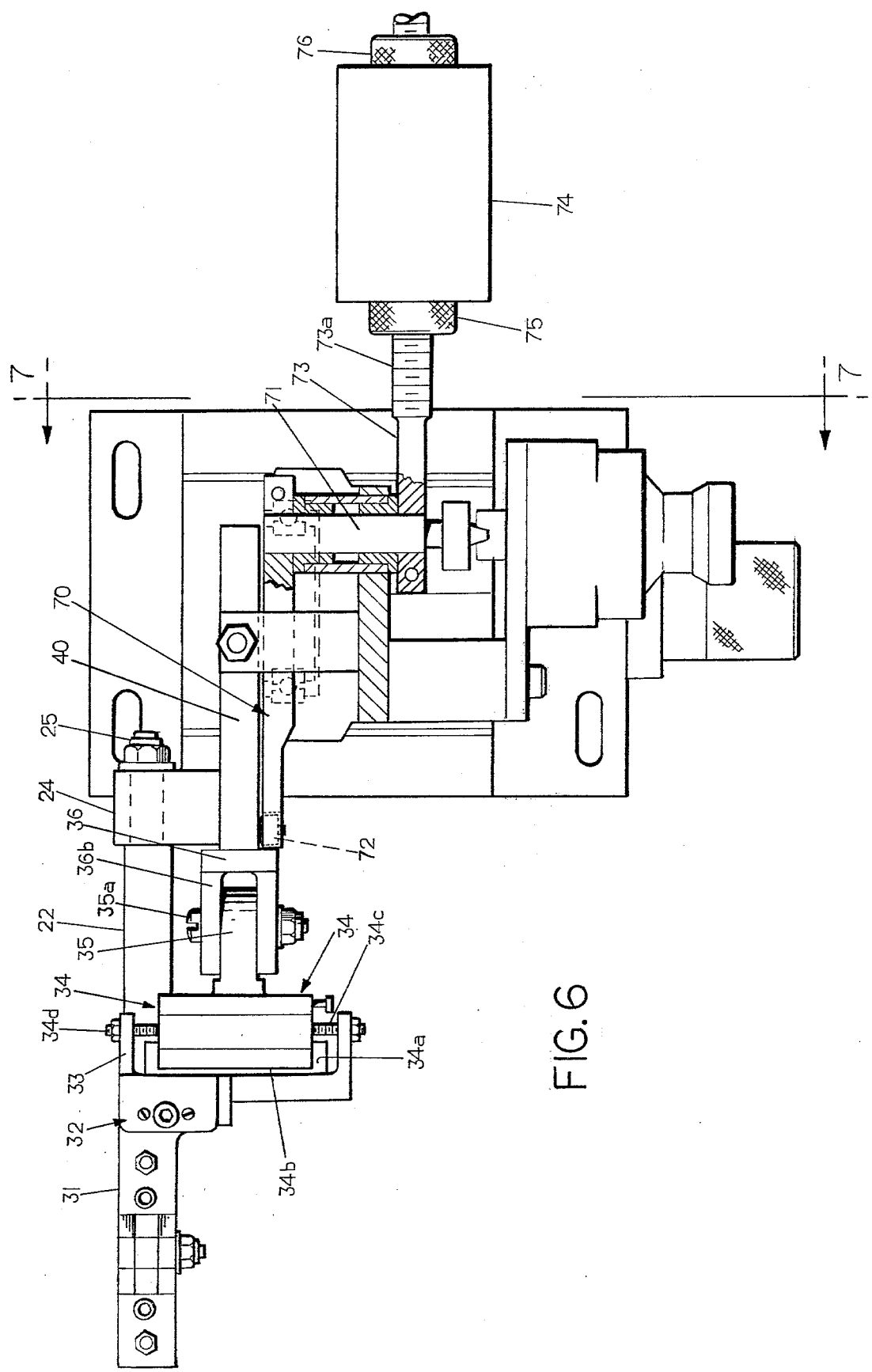
FIG. 6 is a plan view of FIG. 3, with portions shown in horizontal section.
Figure 9:
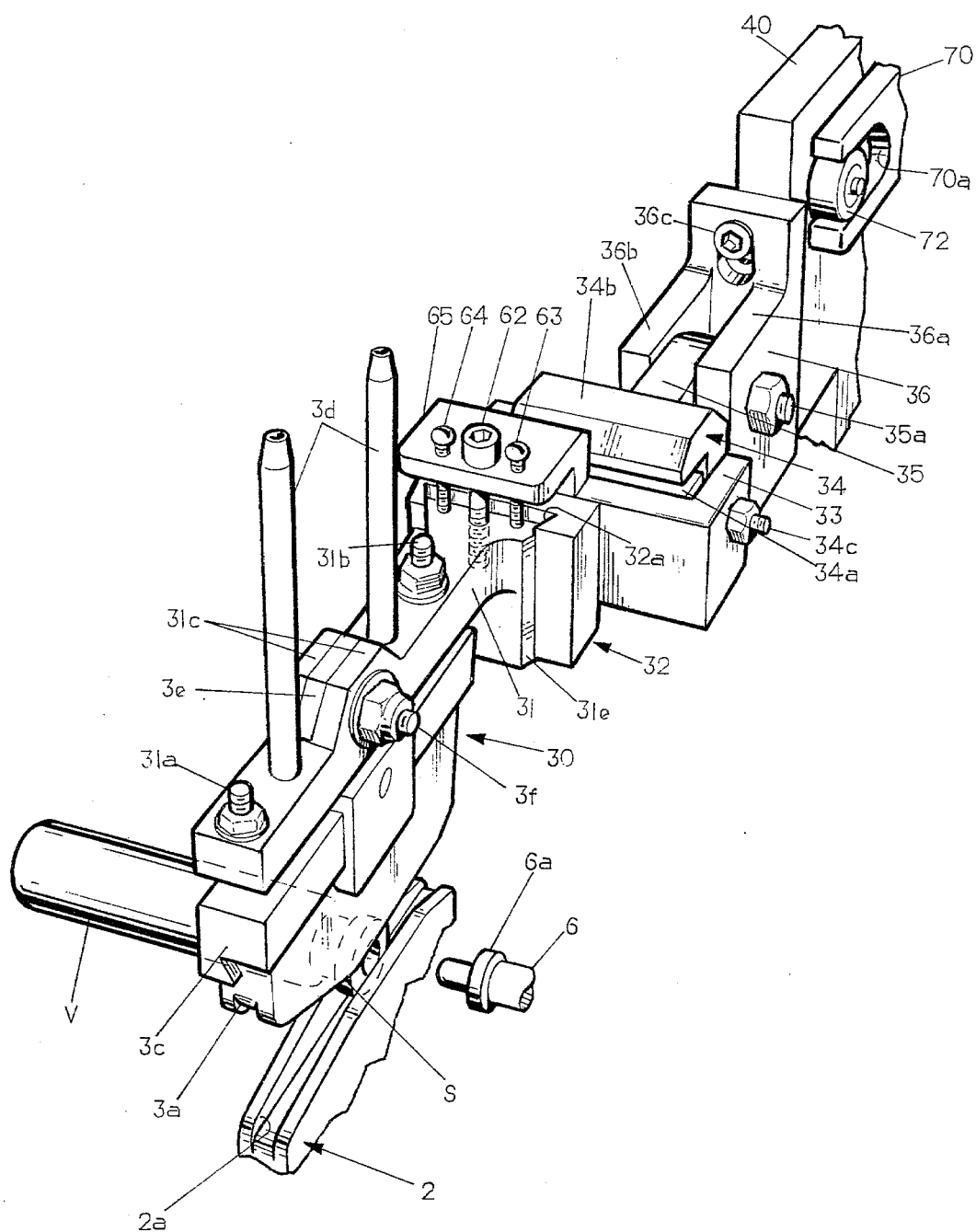
FIG. 9 is an enlarged scale perspective view of the upper tooling jaw arm assembly.

Thus, the upper support arm assembly 30 includes a jaw mounting plate 31 to which the upper jaw unit 3 is attached. The inner end of jaw mounting plate 31 terminates in a vertical spacing adjustment mechanism 32, (FIG. 9) which in turn terminates in a bifurcated portion 33 which is secured to a lateral ball slide mechanism 34. Slide mechanism 34 may be any one of a number of commercially available types that permits relatively frictionless limited linear movement of a block-like element 34a mounted on the base surface of bifurcated portion 33 with respect to a yoke shaped element 34b (FIG. 6 and 9). For example, the unit 34 may comprise an AG ball slide assembly that is sold by Automation Gages of Rochester, N.Y. and is described in U.S. Pat. No. 3,113,807.

The extent of lateral movement provided by ball slide 34 is limited to the order of 0.025" by adjusting bolts 34c and 34d which extends thru the ends of bifurcated portion 33.

Such limited lateral adjustment of the one jaw unit relative to the other is desirable to compensate for any misalignment resulting from differential heat expansion of the two jaw support arm assemblies.

Yoke portion 34b of the ball slide unit 34 is suitably secured to the free end of a pivot lever 35 which in turn is pivotally secured by a bolt 35a between the bifurcated arms 36a and 36b of a bracket 36, which in turn is rigidly secured by bolts 36c to the vertical slide plate 40 heretofore described. The downward pivotal movement of the support lever 35 is limited by engagement with an adjustable stop 35b (FIG. 3) provided on a horizontally projecting portion 36c on the pivot support 36. An over center spring (not shown) normally holds pivot lever 35 in a horizontal position.

From the description thus far, it is apparent that the jaw support arm assemblies 20 and 30 are both rigidly fastened to the slide plate 40 and mounted by such slide plate for concurrent, relatively frictionless movement with respect to the vertical slide guide 45.

The slide guide 45 in turn is mounted for adjustable movement in a horizontal lateral direction with respect to the movement of the vials V through the machine by being mounted on a movable base element 46 which, in turn, is slidably mounted on a stationary base element 47 to produce the aforementioned lateral movement. An adjusting screw 48 is provided which is journalled and axially fixed in an upstanding shoulder 47a on the one end of the fixed base 47 and is threadably engaged with the movable base 46. Accordingly, rotation of the adjusting screw 48 by an enlarged knob 49 produces a lateral shifting of the position of the movable base 46 and hence determines the lateral position of the jaw support arm assemblies 20 and 30 relative to the path of vials V.

Each of the tooling jaw units 2 and 3 are pivotally adjustably mounted on their respective supporting base elements 21 and 31. The jaw unit 2 is mounted to base element 21 by a pivot bolt 2f and the angular position of forming slot 2a relative to the path of the vials V is determined by a pair of adjusting bolts 21a and 21b which are threadably engaged in the mounting plate 21 and respectively engage the opposed longitudinal edges of the tooling jaw assembly 2.

In similar manner, the tooling jaw unit 3 is pivoted to support plate 31 by a pivot bolt 3f and the angular position of the forming slot 3a of jaw 3 relative to the path of the vials through the machine is determined by a pair of positioning bolts 31a and 31b which are respectively threaded through the support plate 31 and engage the extremities of the jaw mounting assembly 3.

It is therefore apparent that the adjustment of the bolts 21a and 21b determines the pitch of the lower forming groove 2a while adjustment of the position of bolts 31a and 31b determines the pitch of the upper forming groove 3a provided in the upper jaw 3.

Figure 7:
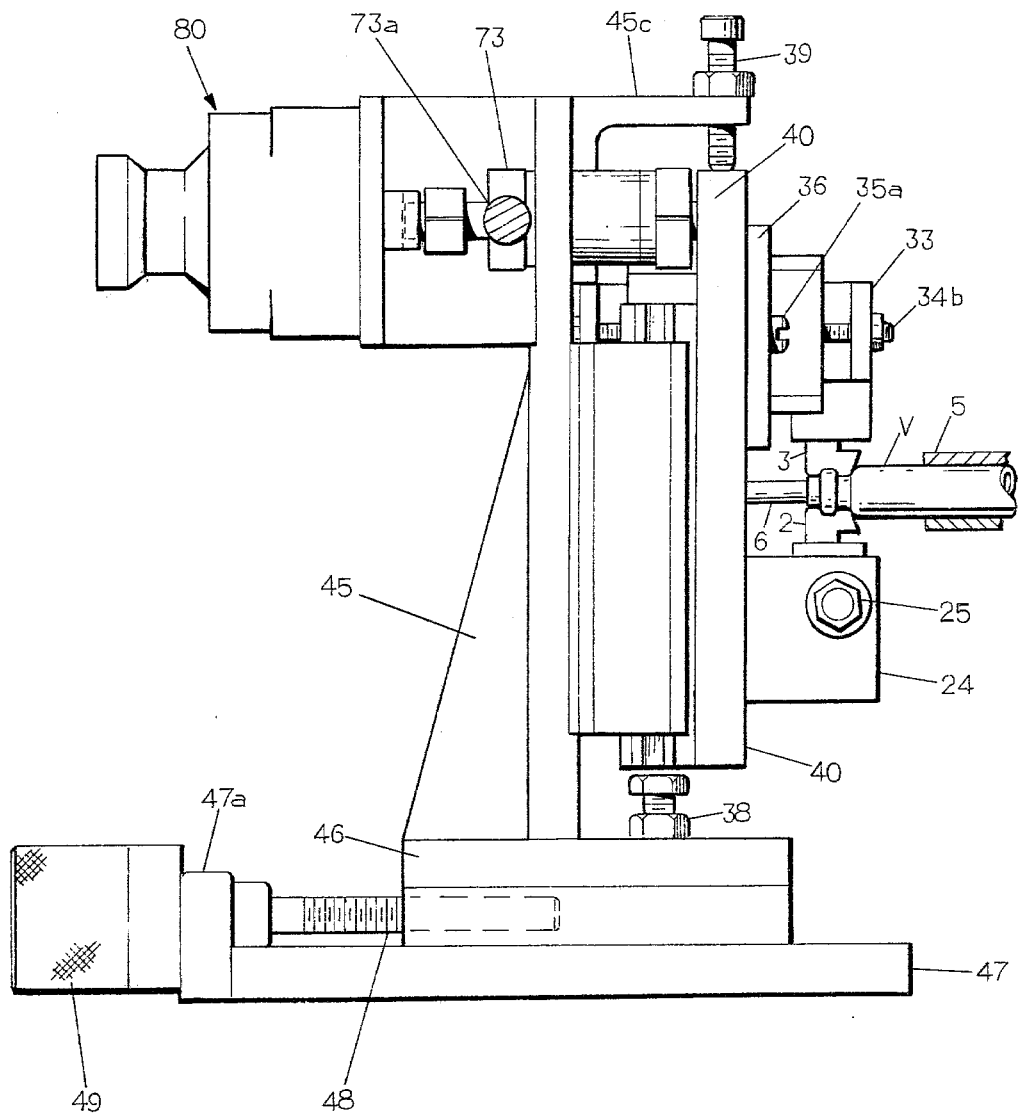
FIG. 7 is a sectional view taken on the plane 7—7 of FIG. 6.

Referring to FIG. 7, the extent of concurrent vertical movement of the two jaw support arm assemblies 20 and 30 is determined by a pair of adjustable stop screws 38 and 39. Screw 38 is mounted on the movable sub base 46 and engages the bottom face of the slide plate 40. Screw 39 is mounted in an overhanging bracket 45c provided on the top end of the slide guide 45 and engages the top face of the slide plate 40.

Since it is obviously desirable that the tooling jaw units 2 and 3 be adjustable in vertical spacing in order to accommodate a range of vial sizes, such vertical spacing is provided by an adjustment unit 32 incorporated in the upper jaw arm assembly 30. As best shown in FIG. 9, such adjustment unit is inserted between the end of upper jaw mounting plate 31 and the adjacent end of laterally shiftable slide block 34. The adjusting mechanism 32 comprises a member defining a vertical dovetailed groove 32a within which the dovetailed end 31e of mounting plate 31 is slidably engaged. The vertical position of the dovetailed portion 31e with respect to the groove 32a is determined by an adjusting bolt 62 and a pair of jack screws 63 and 64. Bolt 62 is journalled in a flange portion 65 which is secured to the bifurcated element 33 and overlies the top end of the dovetailed slot 32a. Rotation of the adjusting bolt 62 varies the vertical position of the dovetailed slide portion 31e and tightening the jack screws 63 and 64 locks the assembly in the selected vertical position. In this manner, very convenient adjustment of the vertical separation of the tooling jaw units 2 and 3 may be conveniently accomplished.

To permit the more convenient adjustment of the pitch adjustment bolts 31a and 31b, the separation adjustment bolt 62, and the pivot movement stop 35b, the entire outer portion of the upper jaw arm assembly 30 can be pivoted about the pivot bolt 35 to a substantially vertical position. The over center spring (not shown) will hold the arm assembly in such upright position.

Figure 4:
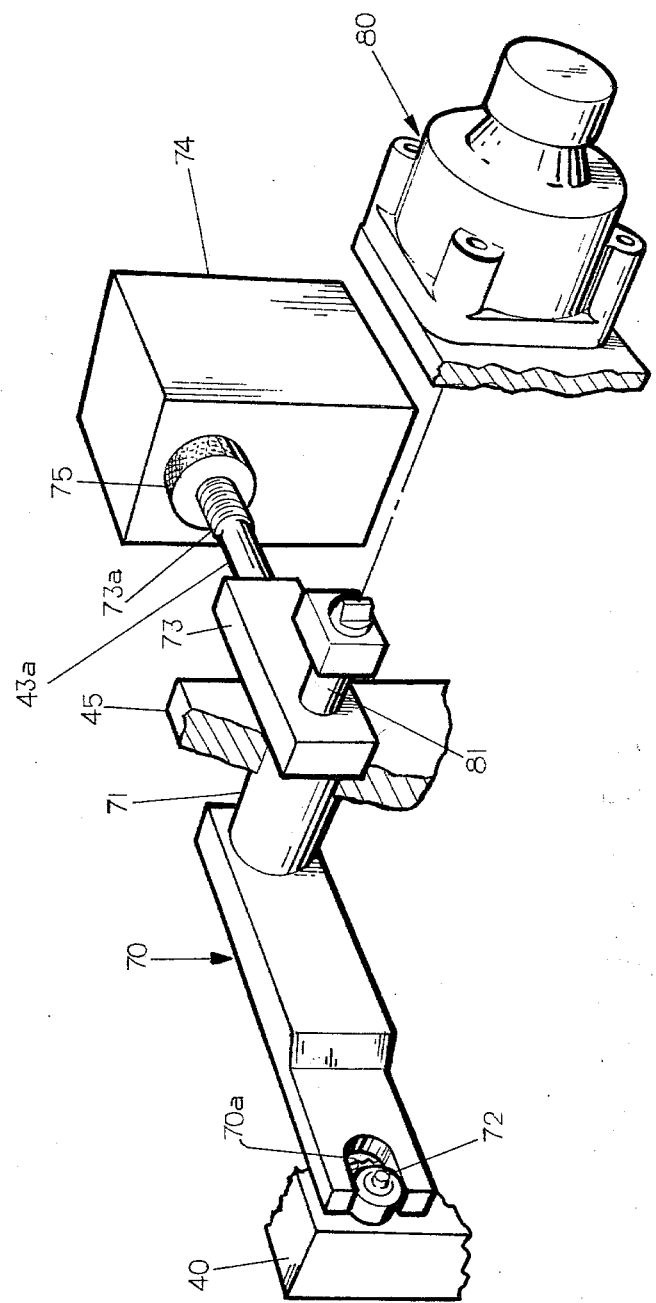
FIG. 4 is a partial perspective, exploded view illustrating the counter balance mechanism incorporated in the machine of FIG. 1.

The relatively frictionless concurrent upward and downward movement of the upper and lower tooling jaw units 2 and 3 provided by the slide plate 40 has already been described. To eliminate all effects of the weight of the apparatus from interferring with such free vertical sliding motion, and to provide, in effect, a true vertical floating motion capability to the cooperating tooling jaw units 2 and 3, a counter balance mechanism is provided comprising a pivot arm 70 (FIG. 4) pivotally mounted by the upper portions of the stationary vertical slide guide 45 by a pivot shaft 71. The free end of arm 70 is slotted as indicated at 70a and engages a roller 72 which is mounted on slide plate 40. A second lever 73 is keyed to shaft 71 and has a threaded bolt like extension 73a welded thereto. A counter-balance weight 74 is mounted on such extension and adjustably positioned thereon by a pair of circular nuts 75 and 76. Thus, the position of the counter-balance weight 74 on the threaded rod 73a may be selected so that the weight of the combined arm support assemblies 20 and 30 and their respective tooling jaw units 2 and 3 will be effectively counter-balanced by the counter-balance weight 74. Therefore, as a vial V is moved into engagement with the tooling jaws 2 and 3, such jaws are free to be moved vertically by the vial so that the center distance between the forming jaws conforms exactly to the axis of the vial passing between the jaws. In this manner, any mis-alignments of the vial V produced by the conveying apparatus will have no effect upon the accuracy of the forming operation performed by the co-operating tooling jaw units 2 and 3.

In order to prevent any undesirable rocking motion of the tooling jaw units 2 and 3 as successive vials enter or leave the jaws, a conventional adjustable torsional damping unit 80 is provided which is mounted on a bracket 45b on top of slide guide 45 and is connected to the pivot shaft 71 so as to yieldingly oppose pivotal movements of such shaft in either direction and counter weight and tooling jaw support arm linkages will not be set into vibration, as any pivotal movement of the counter weight lever 70 is promptly damped by the torsional damper 80.

From the foregoing description, it is apparent that this invention provides a unique, yet extremely reliable tooling mechanism for final forming of shoulders or other contours on the exterior surfaces of a vial. The co-operating tooling jaws between which the heated end of the vial is rotated are respectively mounted on support arms which are in turn rigidly secured to a vertically slidable support plate, and the entire weight of the jaws, the arms and the support plate is effectively counterbalanced so that the tooling jaw units may move without restraint to accommodate themselves to the vertical position of the particular vial passing between the jaws. At the same time, the upper jaw unit is freely laterally shiftable a slight amount relative to the lower jaw so as to prevent the possibility of differential heating destroying the alignment of the upper jaw relative to the lower jaw. Instead, the lower jaw engages the vial, and the upper jaw, if not perfectly aligned with the lower jaw, is shifted by the preliminarily formed shoulders on the vial through lateral slide mechanism 34 to a position of perfect alignment. Lastly, the apparatus is conveniently adjustable to handle a wide range of vial sizes and to permit the convenient replacement of a wide variety of forming tools in the tooling jaw support structures.

Other modifications of this invention will be readily apparent to those skilled in the art and it is intended that the scope of the invention be determined solely by the following claims.

What is claimed is:

1. Apparatus for forming the external contour of a heated tubular glass element comprising, in combination:
   (1) means for concurrently rotating the tubular element and moving same in a linear path;
   (2) a pair of forming tools constructed and arranged to engage opposite sides of the rotating glass element to form a desired external contour thereon;
   (3) a support arm assembly for each forming tool;
   (4) a plate element mounted for vertical movements adjacent said linear path;
   (5) each said support arm assembly being secured to said plate element to position said forming tools respectively above and below said linear path and to move vertically concurrently with said plate element, and
   (6) adjustable means operatively connected to said plate element to counter balance the total weight of said plate element, arm assemblies and said forming tools so that said forming tools are freely concurrently vertically movable by a rotating glass element moving therebetween.

2. Apparatus of claim 1 plus means incorporated in at least one of said support arm assemblies for varying the vertical spacing of said arm assemblies relative to each other, thereby determining the vertical spacing between said forming tools.

3. Apparatus defined in claim 1 wherein at least one of said support arm assemblies includes means permitting relatively frictionless, limited lateral movement of the tool supportng end of said one arm assembly relative to the end secured to said plate element, thereby permitting the forming tool carried by said one arm assembly to be shifted laterally by the movement of a rotating tubular glass element between the forming tools to compensate for any differential temperature expansion of the two support arm assemblies.

4. The apparatus defined in claim 3 wherein said lateral movement means comprises a ball slide unit, and adjustable stop means for limiting the permissive lateral movement of said ball slide unit to a magnitude on the order of 0.025 inches.

5. The apparatus in claims 1, 2, or 3 wherein each of said forming tools is secured to the end of its respective support arm assembly by a horizontal disposed bolt permitting vertical pivotal adjustment movement of the forming tool about said bolt, plus means for securing each forming tool in a fixed pivotal position relative to said bolt.

6. The apparatus defined in claim 1 wherein said last mentioned means includes a counter balance pivot shaft, and means for damping pivotal movements of said shaft.

7. The apparatus defined in claims 1, 2, or 3 plus a stationary support structure for mounting said movable plate element for vertical movements, and said adjustable means comprises: a shaft horizontally journalled in said support structure, a first lever secured to said shaft and projecting therefrom, means on the free end of said first lever engaging a roller horizontally journalled on said movable plate element, a second lever secured to said pivot shaft and projecting therefrom in a direction opposite to said first lever, and means on the free end of said second lever for adjustably mounting a counter weight.

8. The apparatus defined in claims 1, 2, or 3 plus a stationary support structure for mounting said movable plate element for vertical movements, and said adjustable means comprises: a shaft horizontally journalled in said support structure, a first lever secured to said shaft and projecting therefrom, means on the free end of said first lever engaging a roller horizontally journalled on said movable plate element, a second lever secured to said pivot shaft and projecting therefrom in a direction opposite to said first lever, means on the free end of said second lever for adjustably mounting a counter weight, and a torsional damping unit secured to said pivot shaft to damp any pivotal movements of said pivot shaft.

* * * * *